United States Patent [19]
Lagacé

[11] Patent Number: 5,515,936
[45] Date of Patent: May 14, 1996

[54] TRACK TENSIONING SYSTEM FOR ENDLESS TRACK PROPELLED VEHICLE

[75] Inventor: Jean-Hugues Lagacé, Lac Etchemin, Canada

[73] Assignee: Vehicules TS Bellechasse LTEE, Quebec, Canada

[21] Appl. No.: 524,854

[22] Filed: Sep. 7, 1995

Related U.S. Application Data

[63] Continuation-in-part of Ser. No. 500,288, Jul. 10, 1995.

[51] Int. Cl.⁶ .................................................. B62D 55/084
[52] U.S. Cl. ............................... 180/9.1; 180/9.5; 305/21
[58] Field of Search ......................... 180/9.1, 9.5; 305/20, 305/21

[56] References Cited

U.S. PATENT DOCUMENTS

| | | |
|---|---|---|
| 2,536,543 | 1/1951 | Focht . |
| 2,650,818 | 9/1953 | Martin . |
| 3,151,694 | 10/1964 | Rogers . |
| 3,190,384 | 6/1965 | Dufresne ................................. 180/9.5 |
| 3,299,978 | 1/1967 | Sponsler . |
| 3,447,620 | 6/1969 | Schoonover ............................. 305/20 |
| 3,447,621 | 6/1969 | Schoonover ............................. 305/20 |
| 3,471,166 | 10/1969 | Clark . |
| 3,494,438 | 2/1970 | Rose . |
| 3,659,669 | 5/1972 | Mazzarins . |
| 4,185,713 | 1/1980 | Williams et al. . |
| 4,207,956 | 6/1980 | McColl . |
| 4,483,407 | 11/1984 | Iwamoto et al. . |
| 4,781,257 | 11/1988 | Gee et al. ................................. 305/21 |
| 4,817,747 | 4/1989 | Kopczynski . |
| 5,076,378 | 12/1991 | Lagacé . |
| 5,373,909 | 12/1994 | Dow et al. ................................. 305/21 |

FOREIGN PATENT DOCUMENTS

| | | |
|---|---|---|
| 898861 | 4/1972 | Canada ................................. 180/9.1 |
| 2057188 | 2/1995 | Canada . |
| 0593618 | 11/1930 | Germany . |
| 0591113 | 1/1934 | Germany . |
| 2216307 | 10/1973 | Germany . |

*Primary Examiner*—Mitchell J. Hill
*Attorney, Agent, or Firm*—Quarles & Brady

[57] ABSTRACT

A track tensioning system for maintaining a substantially uniform tension on the endless track of a track-propelled vehicle is disclosed herein. The track tensioning system comprises first and second walking beam pivotally mounted on respective lateral sides of a vehicle frame. The first walking beam includes two wheel support assemblies and the second walking beam comprises one wheel support assemblies. The two walking beams are linked through a pivot positioned above a hypothetical line passing through the center of the wheel support assemblies, resulting in an increase or decrease of the effective length of the second walking beam to maintain the tension on the endless track substantially uniform. The effective length of the second walking beam is increased when the vehicle passes over a concave surface and the effective length of the second walking beam is decreased when the vehicle passes over a convex surface. The track tensioning system includes a mechanism to limit the range of relative up-and-down pivotal movements of the first and second walking beams.

9 Claims, 7 Drawing Sheets

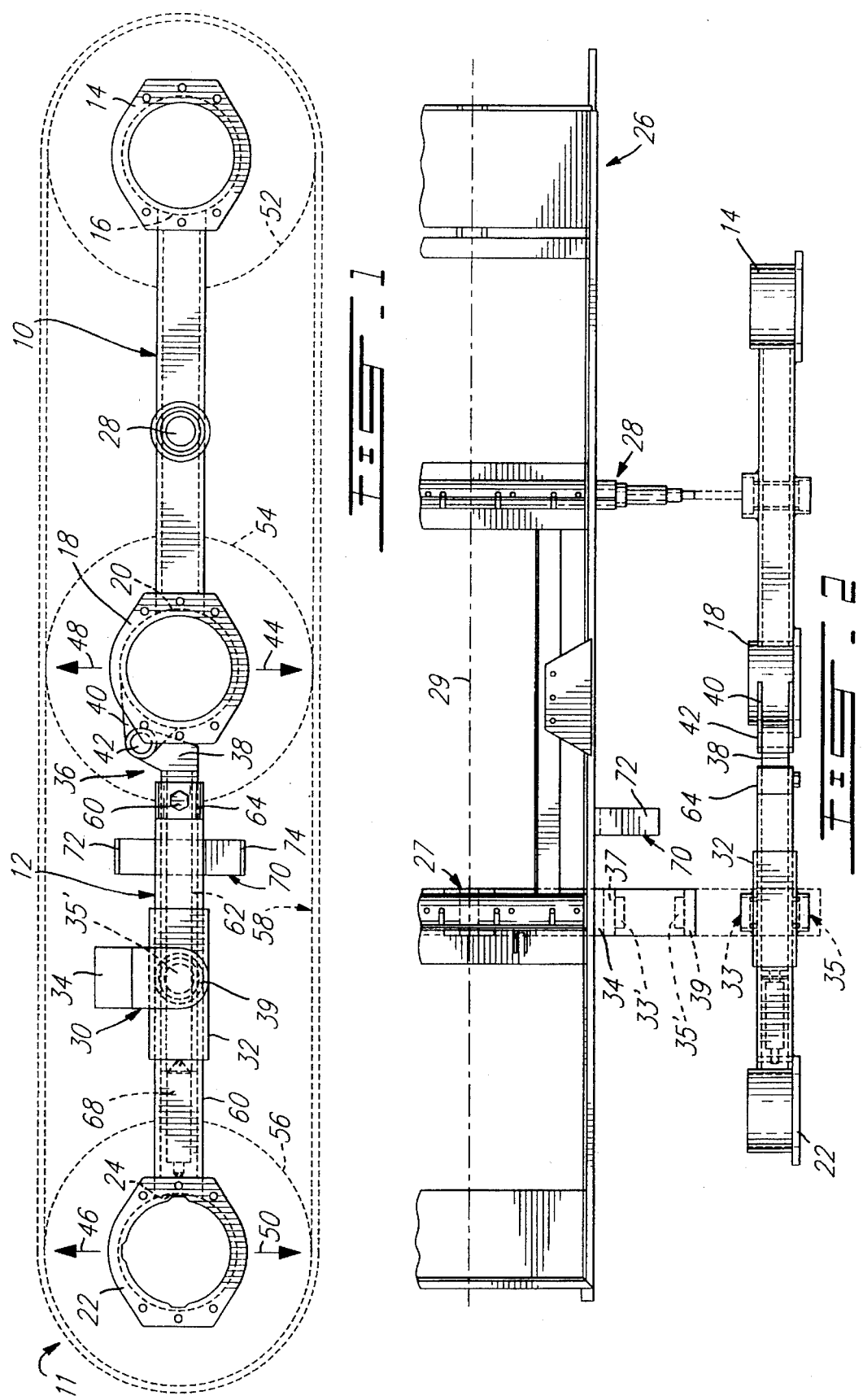

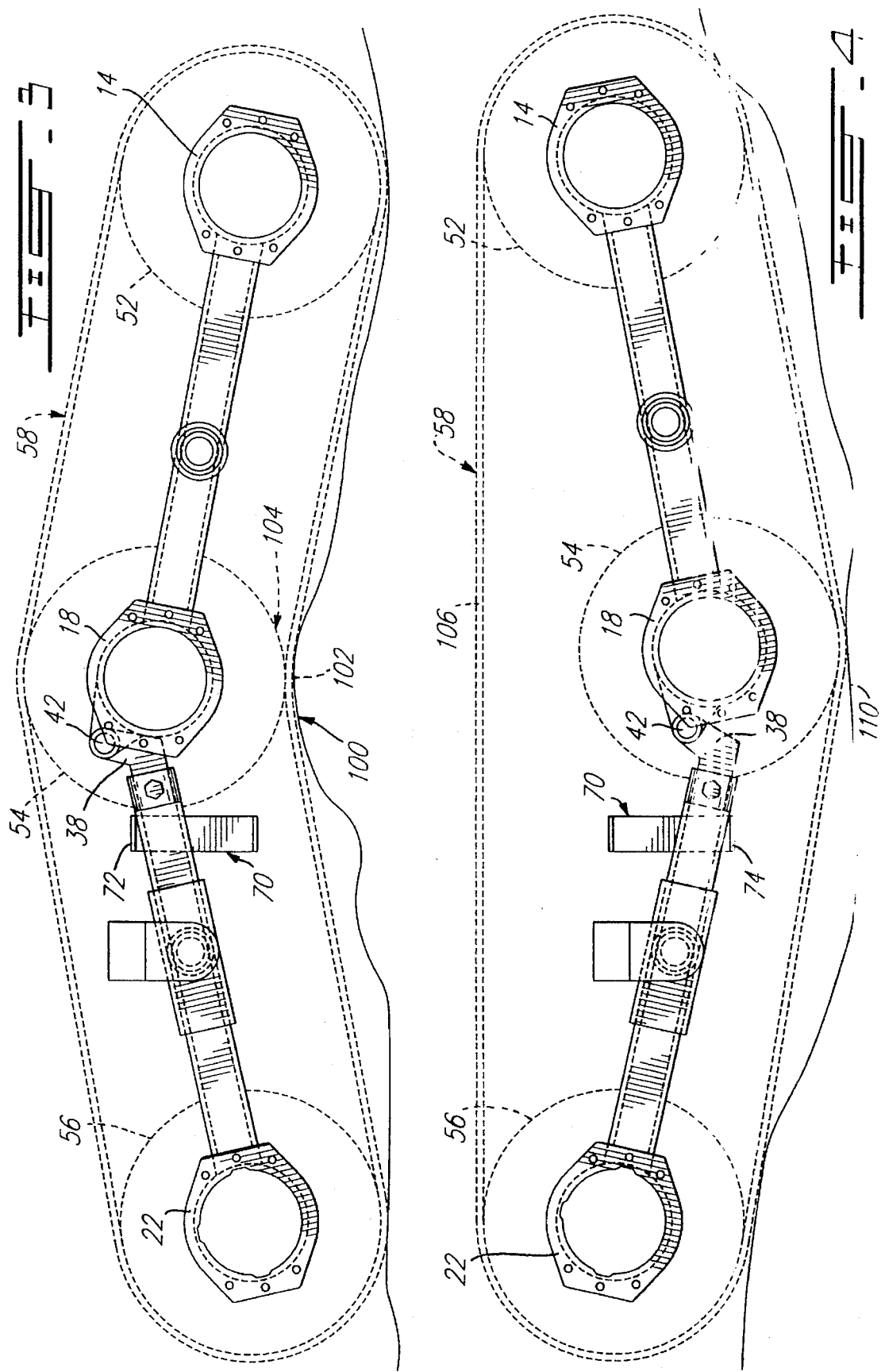

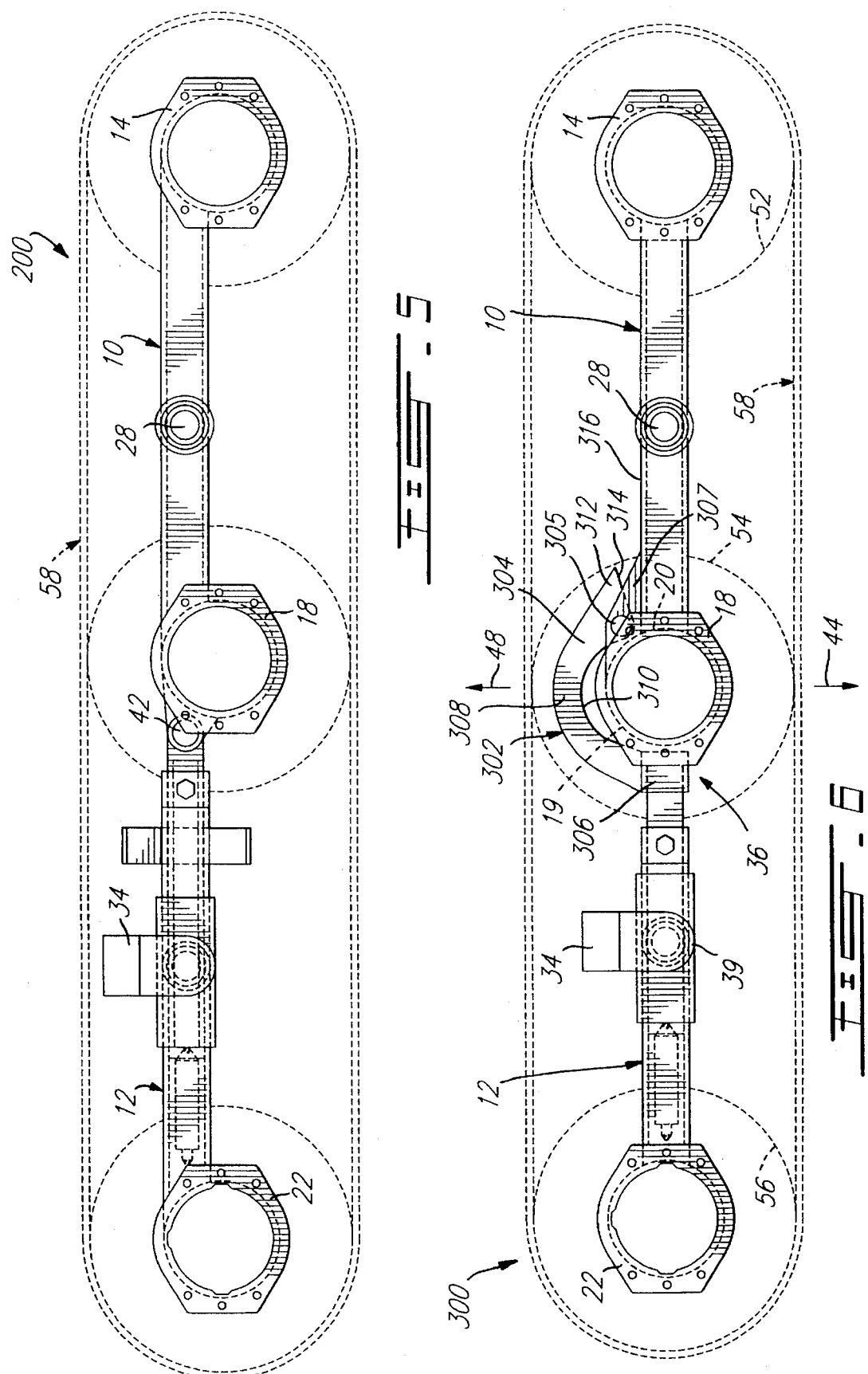

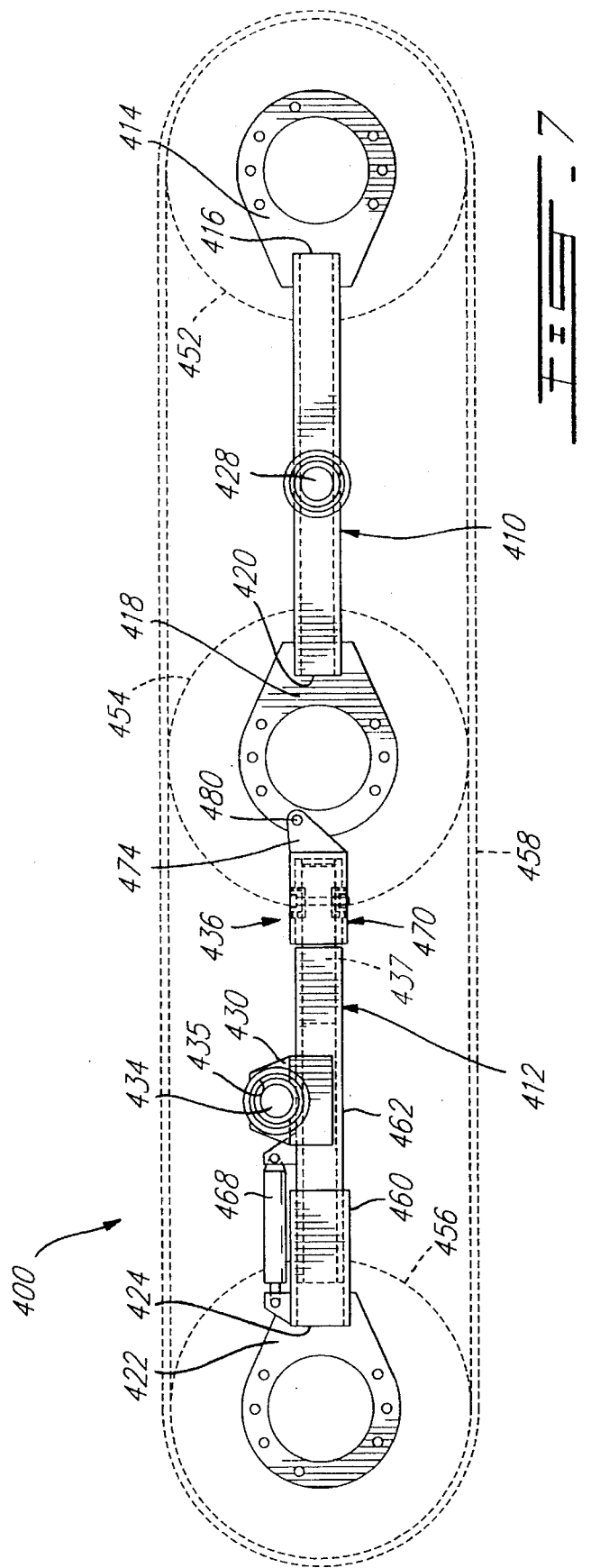

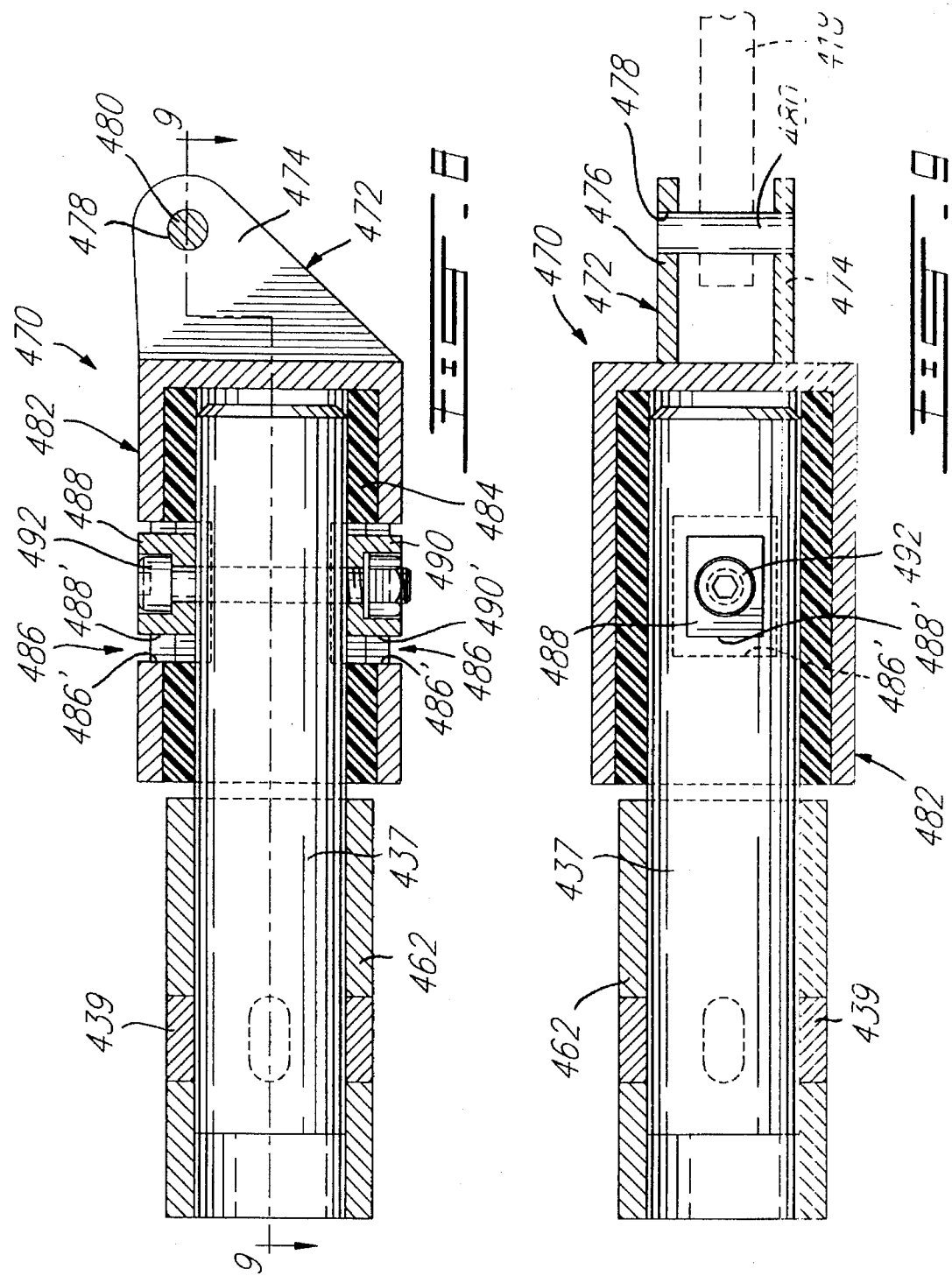

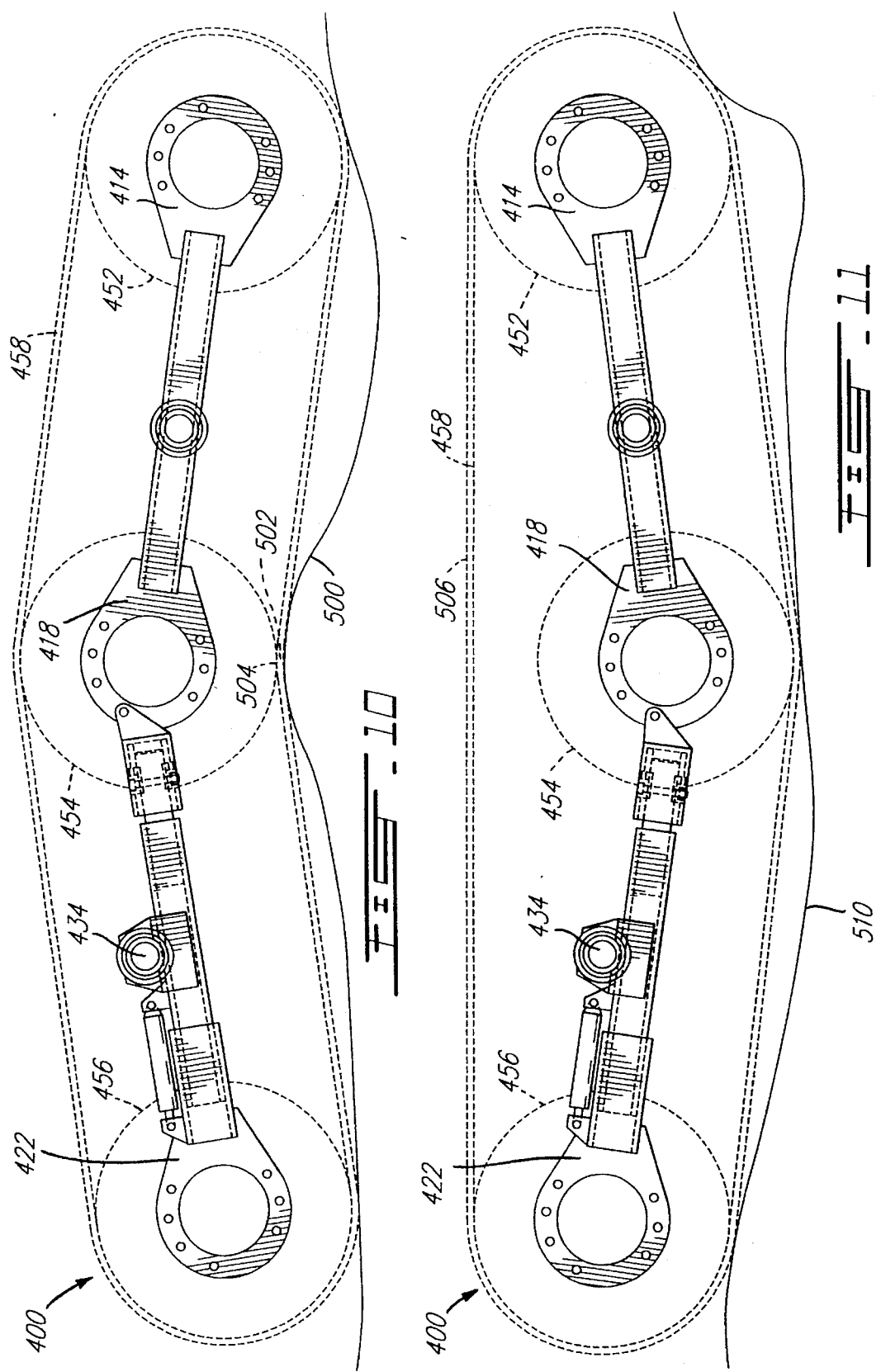

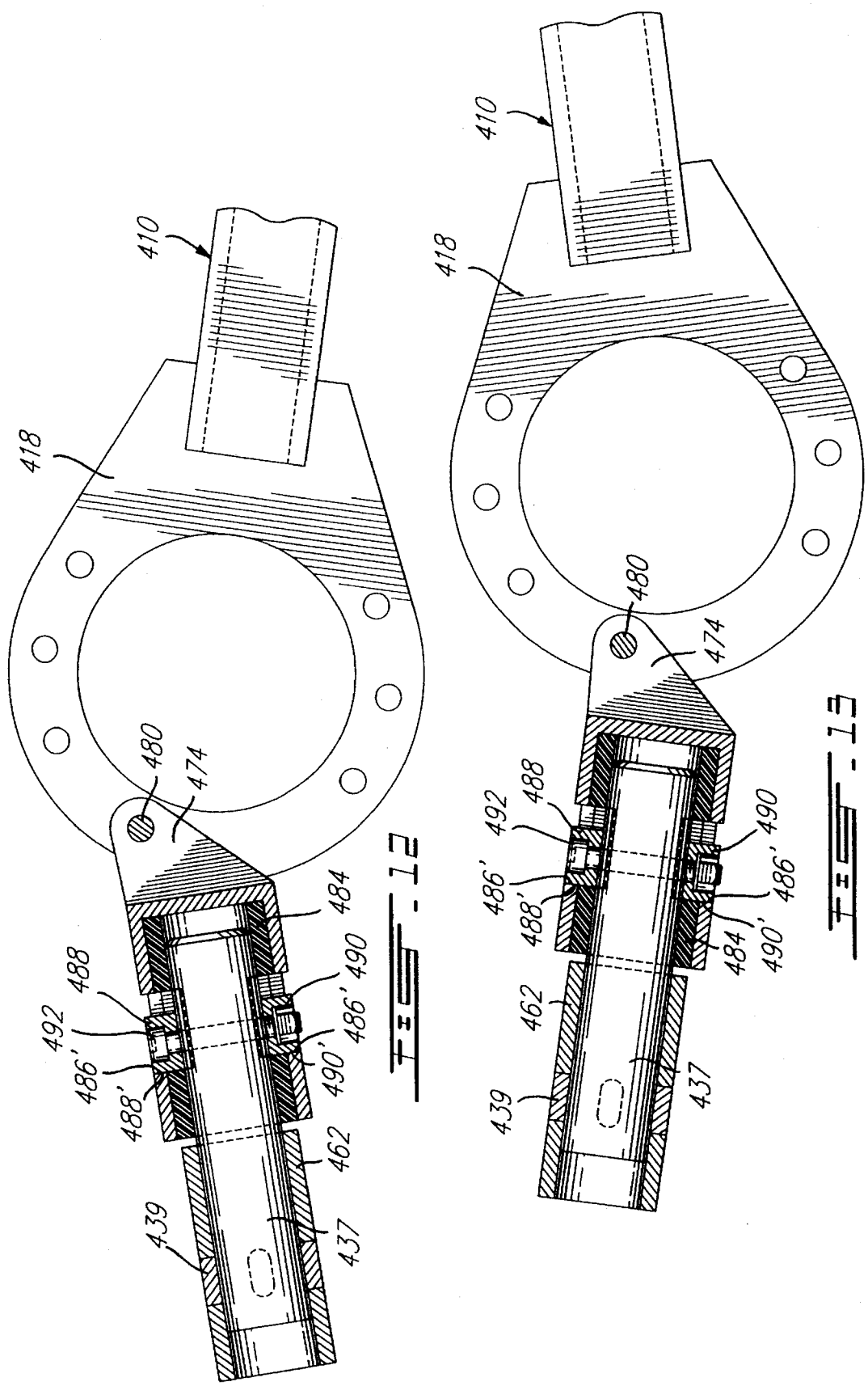

TRACK TENSIONING SYSTEM FOR ENDLESS TRACK PROPELLED VEHICLE

This is a continuation-in-part of U.S. patent application Ser. No. 08/500,288, filed Jul. 10, 1995, pending.

FIELD OF THE INVENTION

The present invention relates to endless track-propelled vehicles. More specifically, the present invention relates to systems for maintaining a substantially uniform tension on the endless track of track-propelled vehicles.

BACKGROUND OF THE INVENTION

Endless track-propelled vehicles are widely known. These vehicles are primarily used as off-highway vehicles and are usually supported by walking beams arranged in pairs, such that each walking beam on one side of the vehicle is paired with another walking beam on the opposite side and such that a pair of wheel axles and wheels are secured to the opposite longitudinal ends of each walking beam. Such construction is conventionally used for relatively long and heavy endless track-propelled off-highway vehicles to produce the necessary load-bearing capacity (see U.S. Pat. No. 3,471,166 issued to, E. G. Clark on Oct. 7, 1969).

It has been proposed by the present inventor, in his U.S. Pat. No. 5,076,378 issued on Dec. 31, 1991, to provide a suspension arrangement for off-highway vehicles wherein a front pair of walking beams and a rear pair of walking beams are joined end-to-end by a simple pivotal joint for positive and simple pivoting of the front beams relative to the rear beams about a transverse axis. In this patent, the inventor provides a telescopic arrangement of one pair of walking beams to allow for extension and contraction of those beams upon up-and-down pivoting of the pairs of walking beams. The shafts pivotally joining the walking beams to the frame of the vehicle are positioned strategically so that the same endless track length is needed substantially throughout the range of relative up-and-down pivotings of the front and rear walking beams.

However, since the telescopic arrangement of one pair of walking beams is located between the two shafts joining the walking beams to the frame of the vehicle, the tension imparted to the endless track is supported by the shafts. It is therefore necessary to provide shafts which are stronger and larger than usual to support this tension and the weight of the vehicle.

Furthermore, since the telescoping portion of one of the walking beams is provided at a location where shearing forces are generated by the up-and-down pivoting of the front and rear beams, premature wear may appear at the telescoping portion of one of the walking beams.

There is therefore a need, in a track tensioning system, for a walking beam arrangement for endless track-propelled vehicles which would ensure a substantially uniform tension on the endless track without causing premature wear to the walking beams.

OBJECT OF THE INVENTION

An object of the present invention is therefore to provide an improved track tensioning system for endless track-propelled vehicles.

Another object of the present invention is to provide an improved mechanism for limiting the range of relative up-and-down pivotal movements of the front and rear walking beams.

SUMMARY OF THE INVENTION

More specifically, in accordance with the present invention, there is provided a track tensioning system for a track-propelled vehicle having a frame and first and second longitudinally spaced shafts extending laterally from each opposite side of the frame; the system comprising:

a first walking beam pivotally mounted to each first shaft and having an inner end and an outer end;

a first wheel support assembly mounted at the outer end of the first walking beam;

a second wheel support assembly mounted at the inner end of the first walking beam;

a second walking beam pivotally mounted to each second shaft and having an inner end and an outer end;

a third wheel support assembly mounted at the outer end of the second walking beam;

means allowing the second walking beam to be longitudinally displaced while being pivotally mounted to the second shaft;

a pivot connection having a pivoting axis; the pivot connection joining the inner end of the second walking beam to the second wheel support assembly; the pivoting axis of the pivot connection lying above a plane comprising the first, second and third wheel support assemblies when the first, second and third wheel support assemblies are coplanar.

In accordance with another aspect of the present invention there is provided a range limiting mechanism for a track tensioning system of a track-propelled vehicle, said track propelled vehicle having a frame and first and second longitudinally spaced shafts extending laterally from each opposite side of said frame; said track tensioning system having:

a first walking beam pivotally mounted to each said first shaft and having an inner end and an outer end;

a first wheel support assembly mounted at said outer end of said first walking beam;

a second wheel support assembly mounted at said inner end of said first walking beam;

a second walking beam pivotally mounted to each said second shaft and having an inner end and an outer end;

a third wheel support assembly mounted at said outer end of said second walking beam; said range limiting mechanism comprising:

a first end mounted to said inner end of said second walking beam;

a second end;

a pivot connection having a pivot axis; said pivot connection joining said second end of said range limiting mechanism to said second wheel support assembly; and means limiting pivotal movement of said first and second walking beams about said first and second shafts, respectively, when said first and second walking beams have reached a predetermined angle of pivotment, said limiting means being separate from said frame of said track propelled vehicle.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 1 illustrates a side plan view of a first embodiment of a track tensioning system for an endless track-propelled vehicle according to the present invention;

FIG. 2 illustrates a top plan view of the track tensioning system of FIG. 1 and a portion of a frame of an endless track-propelled vehicle;

FIG. 3 illustrates a side plan view of the track tensioning system of FIG. 1 in operation over a bulging surface;

FIG. 4 illustrates a side plan view of the track tensioning system of FIG. 1 in operation over a surface forming a depression;

FIG. 5 illustrates a side plan view of a second embodiment of a track tensioning system for an endless track-propelled vehicle according to the present invention;

FIG. 6 illustrates a side plan view of a third embodiment of the present invention showing a mechanism for limiting the range of relative up-and-down pivotal movements of the front and rear walking beams;

FIG. 7 illustrates a side plan view of a fourth embodiment of the present invention showing a mechanism for limiting the range of relative up-and-down pivotal movements of the front and rear walking beams;

FIG. 8 illustrates an enlarged sectional view of the improved range limiting mechanism illustrated in FIG. 7;

FIG. 9 illustrates a sectional view taken along line 9—9 of FIG. 8;

FIG. 10 illustrates a side plan view of the embodiment of FIG. 7 in operation over a bulging surface;

FIG. 11 illustrates a side plan view of the embodiment of FIG. 7 in operation over a surface forming a depression;

FIG. 12 illustrates an enlarged sectional view of the range limiting device of FIGS. 7–11 when the track tensioning system is in the position illustrated in FIG. 10; and FIG. 13 illustrates an enlarged sectional view of the range limiting device of FIGS. 7–11 when the track tensioning system is in the position illustrated in FIG. 11.

DETAILED DESCRIPTION OF PREFERRED EMBODIMENTS

It is important to note that the following description of preferred embodiments of the present invention will describe only one side of the track tensioning system. It is, however, to be understood that both sides of the track tensioning system are identical.

Referring to FIG. 1, a track tensioning system 11 for an endless track-propelled vehicle (not shown) according to a first embodiment of the present invention will now be described.

The track tensioning system 11 comprises a first walking beam 10 and a second walking beam 12.

The first walking beam 10 has a rectangular cross-section and includes a first wheel support assembly 14 mounted at an outer end 16 of the walking beam 10 and a second wheel support assembly 18 mounted at an inner end 20 of the walking beam 10.

The second walking beam 12 includes a third wheel support assembly 22 mounted at an outer end 24 of the walking beam 12.

It is to be noted that the structure of the first, second and third wheel support assemblies 14, 18 and 22 may vary from the structure illustrated in FIG. 1. Indeed, depending on the type of wheels and on the type of motors being used, the structure of the wheel support assemblies 14, 18 and 22 may be modified to support the wheels and motors used.

Referring to FIGS. 1 and 2, the first walking beam 10 is pivotally mounted to a frame or under-frame 26 through a first shaft 28 extending laterally from the frame 26. The first shaft 28 has a circular cross-section to allow the pivoting of the first walking beam 10 thereon. Of course, bearings or other friction reduction devices may be used to reduce the friction between the first shaft 28 and the first walking beam 10. It is to be understood that the first walking beam 10 may pivot on the second shaft 28 independently from the first walking beam (not shown) mounted on the other side of the frame 26.

The second walking beam 12 has a rectangular external cross-section and is slidably mounted into a tube 32 having internal dimensions slightly larger than the external dimensions of the second walking beam 12 to thereby allow the second walking beam 12 to slide therein. Grease or other lubricating material may be introduced between the external surface of the second walking beam 12 and the internal surface of the tube 32 to decrease the wear of the walking beam 12 and the tube 32.

The tube 32 is pivotally mounted to a second shaft 34 of the frame 26 through an inverted U-shaped pivoting element 30. The shaft 34 has a rectangular cross-section, as illustrated in FIG. 1, and is pivotally mounted to the frame 26 through a conventional pivoting arrangement 27 (FIG. 2) to thereby allow the second shaft 34 to pivot with respect to a longitudinal axis 29 of the frame 26.

As better seen from FIG. 1, the pivoting element 30 is mounted to an underside of the second shaft 34. The inverted U-shaped pivoting element 30 includes a first downwardly extending branch 37 and a second downwardly extending branch 39 spaced apart from the first branch 37 (FIG. 2). The first branch 37 includes a first cylindrical protrusion 33' dimensioned to enter a first aperture 33 of the tube 32. Similarly, the second branch 39 includes a second cylindrical protrusion 35' dimensioned to enter a second aperture 35 of the tube 32. It is to be noted that the first and second cylindrical protrusions 33' and 35' are coaxial, thereby allowing the tube 32 to pivot thereon.

As can be easily understood, one of the first and second branches 37 and 39 of the pivoting element 30 can be removed from the pivoting element 30 to allow the insertion of the second walking beam 12 therebetween. The removed branch is then mounted back to the pivoting element 30.

Again, bearings or other friction reduction devices may be used to reduce the friction between the first and second cylindrical protrusions 33' and 35' and the first and second apertures 33 and 35, respectively.

The second walking beam 12 may pivot with respect to the second shaft 34 of the frame 26 and the second walking beam 12 may longitudinally slide in the tube 32 while being pivotally connected to the second shaft 34 through the inverted U-shaped pivoting element 30. Again, it is to be understood that the second walking beam 12 may pivot on the second shaft 34 independently from the second walking beam (not shown) mounted on the other side of the frame 26.

As can be easily understood, other means could be used to pivotally attach the tube 32 to the shaft 34 while allowing the second walking beam 12 to slide in the tube 32.

The second walking beam 12 includes an inner end 36 having an upwardly angled portion 38, the function of which will be described hereinafter. The second wheel support assembly 18 includes a bracket 40 fixedly mounted thereon. The upwardly angled portion 38 of the inner end 36 of the second walking beam 12 is pivotally mounted to the bracket 40 of the second wheel support assembly 18 through a pivot 42.

Therefore, if the first walking beam 10 is pivoted about the first shaft 28 so that the second wheel support 18 is moved in the direction of arrow 44, the second walking beam 12 is pivoted about the second shaft 34 so that the third wheel support 22 is moved in the direction of arrow 46. Similarly, if the first walking beam 10 is pivoted about the first shaft 28 so that the second wheel support 18 is moved in the direction of arrow 48, the second walking beam 12 is pivoted about the second shaft 34 so that the third wheel support 22 is moved in the direction of arrow 50. These movements are, of course, made possible by the pivot 42 linking the first and second walking beams 10 and 12.

As previously mentioned, this type of track tensioning system may advantageously be installed on a vehicle propelled by an endless track. FIG. 1 of the appended drawings schematically illustrates, in dashed lines, wheels 52, 54 and 56 mounted to the wheel support assemblies 14, 18 and 22, respectively. Also illustrated in this figure is an endless track 58 mounted around wheels 52, 54 and 56.

Since the endless track 58 must be properly tensioned around the wheels 52, 54 and 56, to provide an adequate friction between the wheels 52, 54 and 56 and the track 58, the second walking beam 12 is telescoping. The walking beam 12 is retracted when the endless track 58 is installed or removed and is extended after the installation of the endless track 58, so as to properly tension the endless track 58 around the wheels 52, 54 and 56.

The second walking beam 12 includes an external tube 60 and an internal tube 62 in telescoping relationship with the external tube 60. The external tube 60 includes an adjustable stopping element 64 which may be secured to the internal tube 62 through a fastener 66. The stopping element 64 is provided to set the length of the second walking beam 12 when the required length of the second walking beam 12 is reached. Indeed, since the stopper 64 is mounted to the external tube 60, the length of the second walking beam 12 may not be changed when the fastener 66 of the stopping element 64 is secured to the internal tube 62.

A hydraulic cylinder 68, joining the external tube 60 to the internal tube 62, is provided inside the external tube 60 to force the extension of the second walking beam 12 when the fastener 66 of the stopping piece 64 is not secured to the internal tube 62. Indeed, the hydraulic cylinder 68 produces a pressure pushing the internal tube 62 outside the external tube 60.

As illustrated in FIG. 1, the pivot 42 is located above a hypothetical line (not shown) joining the center of the wheel support assemblies 14, 18 and 22. This is an important feature since it allows the endless track 58 to retain a substantially uniform tension on the wheels 52, 54 and 56 for a limited range of up-and-down movements of the first and second walking beams 10 and 12, as will be described hereinafter with reference to FIGS. 3 and 4. The range of up-and-down movements of the second walking beam 12 is defined by a C-shaped bracket 70 mounted to the side of the frame 26 and having upper 72 and lower 74 branches extending laterally from the frame (see FIG. 2).

FIG. 3 illustrates a side plan view of the track tensioning system 11 of FIG. 1 in operation over a bulging surface 100. Since the surface 100 presents a convex cross-section, the second wheel support assembly 18 is pushed higher than the first and third wheel support assemblies 14 and 22. A lower portion 102 of the endless track 58 is maintained against a lower portion 104 of the second wheel 54 by the bulging surface 100.

As can be easily understood, the length of the endless track 58 illustrated in FIGS. 1 and 3 does not change. Therefore, to prevent damages to the endless track 58, when the second wheel support assembly 18 rises as illustrated in FIG. 3, the effective length of the second walking beam 12 must be decreased to thereby keep a substantially uniform tension on the endless track 58 and avoid over-tensioning the endless track 58.

As previously mentioned, the pivot 42 joining the first walking beam 10 to the second walking beam 12, is positioned above a hypothetical straight line joining the first, second and third wheel support assemblies 14, 18 and 22, when the first and second walking beams 10 and 12 are in the position of FIG. 1. As illustrated in FIG. 3, this position of the pivot 42, enables the first wheel support assembly 14 to be moved closer to the third wheel support assembly 22 when the endless track 58 is over a bulging surface 100. Indeed, the angle formed by the upwardly angled portion 38 of the inner end 36 of the second walking beam 12 combined with the position of the pivot 42 allow the tension of the endless track 58 to remain substantially uniform for a limited upward movement of the second wheel support assembly 18 by decreasing the effective length of the second walking beam 12.

FIG. 3 illustrates the highest position of the second wheel support assembly 18 for the track tensioning system 11 illustrated. The second walking beam 12 is in contact with the upper branch 72 of the C-shaped bracket 70; therefore, the second wheel support assembly 18 cannot extend higher than the position illustrated in FIG. 3.

FIG. 4 illustrates a side plan view of the track tensioning system 11 of FIG. 1 in operation over a surface forming a depression 110. Since the surface 110 presents a concave cross-section, the second wheel support assembly 18 is pushed lower than the first and third wheel support assemblies 14 and 22. An upper portion 106 of the endless track 58 is not in contact with the second wheel 54.

As can be easily understood, the length of the endless track 58 illustrated in FIGS. 1 and 4 does not change. Therefore, to prevent endless track 58 from being disengaged from the wheels 52, 54 and 58, when the second wheel support assembly 18 is lowered as illustrated in FIG. 4, the effective length of the second walking beam 12 must be increased to thereby keep a substantially uniform tension on the endless track 58 and avoid under-tensioning of the endless track 58.

Again, as illustrated in FIG. 4, the position of the pivot 42 enables the first wheel support assembly 14 to be moved farther from the third wheel support assembly 22 when the endless track 58 is over a surface 110 defining a depression. The angle formed by the upwardly angled portion 38 of the inner end 36 of the second walking beam 12 combined with the position of the pivot 42 allows the tension of the endless track 58 to remain substantially uniform for a limited downward movement of the second wheel support assembly 18 by increasing the effective length of the second walking beam 12.

FIG. 4 illustrates the lowest position of the second wheel support assembly 18 for the track tensioning system 11 illustrated. The second walking beam 12 is in contact with the lower branch 74 of the C-shaped bracket 70; therefore, the second wheel support assembly 18 cannot extend lower than the position illustrated in FIG. 4.

As can be easily understood, by modifying the position of the pivot 42, the angle of the angled portion 38 and/or the length of the angled portion 38, it is possible to design a track tensioning system having a second wheel support assembly 18 which can travel higher than illustrated in FIG. 3 while keeping the tension of the endless track 58 substantially uniform. Similarly, it is possible to design a track tensioning system having a second wheel support assembly 18 which can travel lower than illustrated in FIG. 4 while keeping the tension of the endless track 58 substantially uniform.

FIG. 5 illustrates a second embodiment of a track tensioning system 200 for an endless track-propelled vehicle.

The major difference between the track tensioning system 11 illustrated in FIGS. 1–4 and the track tensioning system 200 illustrated in FIG. 5 is the position of the wheel support assemblies 14, 18 and 22 on the first and second walking beams 10 and 12. The wheel support assemblies 14, 18 and 22 are positioned so that their center is lower than a hypothetical line joining the first shaft 38 to the second shaft 34. Thereby, for maintaining a substantially uniform tension on the endless track 58, as defined hereinabove with reference to FIGS. 3 and 4, the pivot 42 may be positioned at the same level as the first and second shafts 28 and 34, since the wheel support assemblies 14, 18 and 22 are positioned under the shafts 28 and 34.

As can be easily understood, the relative motions of the wheel support assemblies 14, 18 and 22 of the track tensioning system 200 are similar to the relative motions of the wheel support assemblies 14, 18 and 22 of the track tensioning system 11. A substantially uniform tension is maintained on the endless track 58 in the same manner as described hereinabove with reference to FIGS. 3 and 4.

Turning now to FIG. 6 of the appended drawings, a third embodiment of a track tensioning system 300 for an endless track-propelled vehicle will be described. The track tensioning system 300 includes an improved range limiting mechanism 302 for limiting the range of relative up-and-downs pivotal movements of the first and second walking beams 10 and 12.

It is to be noted that the general operation of the track tensioning system 300 of FIG. 6 is very similar to the operation of the track tensioning system 11 described hereinabove with reference to FIGS. 1–4 and therefore will not be repeated here.

One major difference between the track tensioning system 300 and the track tensioning system 11 of FIGS. 1–4 is the range limiting mechanism 302 replacing the C-shaped bracket 70.

It has been found that having a C-shaped bracket 70 to limit the relative up-and-down pivotal movements of the first and second walking beams 10 and 12, may restrict the way the first and second walking beams 10 and 12 are mounted to a frame of a vehicle. Indeed, when the walking beams 10 and 12 are mounted relatively close to the frame of the vehicle (see FIG. 2) using a C-shaped bracket 70 to limit the pivotal movements of the walking beams 10 and 12 is adequate since the upper and lower branches 72 and 74 of the C-shaped bracket 70 are relatively short and therefore are very rigid. However, when the walking beams 10 and 12 are to be mounted further away from the frame of the vehicle (not shown), the increased length of the branches 72 and 74 of the C-shaped bracket 70 will cause problems since the flexibility of the branches 72 and 74 increases with their length, possibly leading to an inadequate range limitation of the relative up-and-down pivotal movements of the walking beams 10 and 12 since the branches 72 and 74 may bend under the influence of the walking beams 10 and 12.

As has been explained hereinabove with reference to FIGS. 3 and 4, the range of relative up-and-down pivotal movements of the walking beams 10 and 12 must be limited to keep a substantially uniform tension on the track 58. It will be apparent that, referring to FIG. 3, if the second wheel support assembly 18 rises higher than illustrated in this figure, the tension of the endless track 58 will not remain uniform but will increase, possibly leading to damage to the endless track 58. Similarly, it will be apparent that, referring to FIG. 4, if the second wheel support assembly 18 lowers more than is illustrated in this figure, the tension of the endless track 58 will not remain uniform but will decrease, possibly leading disengagement of the endless track 58 from the wheels 52, 54 and 58.

It has been found that the relative range of up-and-down pivotal movements of the first and second walking beams 10 and 12 may be limited by a mechanism mounted to the first and second walking beams 10 and 12 but having no portion directly in contact with the frame of the vehicle. It is therefore possible to easily mount the first and second walking beams 10 and 12 away from the frame of the vehicle without experiencing the above noted drawbacks associated with the C-shaped bracket 70.

Returning to FIG. 6, the range limiting mechanism 302 is mounted between the first and the second walking beams 10 and 12 but is not in contact with the frame of the vehicle (not shown).

The range limiting mechanism 302 includes a first end 304 adapted to be pivotally mounted to a bracket 307, provided in the proximity of the inner end 20 of the first walking beam 10, through a pivot assembly 305. The limiting mechanism 302 also includes a second end 306 adapted to be mounted to the inner end 36 of the second walking beam 12, and a curved portion 308 joining the first end 304 to the second end 306. The curved portion 308 includes a bottom surface 310. The first end 304 includes a pointed extension 312 having a flat bottom surface 314.

In operation, when the second wheel support assembly 18 is forced to rise in the direction of arrow 48, the upward movement of the support assembly 18 is stopped when the bottom surface 310 of the curved portion 308 contacts an external surface 19 of the second wheel support assembly 18.

Similarly, when the second wheel support assembly 18 is forced to lower in the direction of arrow 44, the downward movement of the support assembly 18 is stopped when the bottom surface 314 of the pointed member 312 contacts an upper surface 316 of the first walking beam 10. Therefore, the range limiting mechanism 302 adequately limits the range of relative up-and-down pivotal movements of the first and second walking beams 10 and 12 without being in contact with the frame of the vehicle.

It is to be noted that the pivot assembly 305 pivotally connecting the first end 304 of the range limiting mechanism 302 to the first walking beam 10 is located above a hypothetical line joining the center of the wheel support assemblies 14, 18 and 22. This is an important feature since it allows the endless track 58 to retain a substantially uniform tension on the wheels 52, 54 and 56 for a limited range of up-and-down pivotal movements of the first and second walking beams 10 and 12 as described above with reference to pivot 42 and FIGS. 3 and 4.

Turning now to FIG. 7 of the appended drawings, a fourth embodiment of a track tensioning system 400 for an endless track-propelled vehicle will be described.

The track tensioning system 400 comprises a first walking beam 410 and a second walking beam 412.

The first walking beam 410 has a rectangular cross-section and includes a first wheel support assembly 414 mounted at an outer end 416 thereof and a second wheel support assembly 418 mounted at an inner end 420 thereof.

The second walking beam 412 includes a third wheel support assembly 422 mounted at an outer end 424 thereof. More specifically, the second walking beam 412 includes a first tube portion 462 telescopically inserted in a second larger tube portion 460. A hydraulic cylinder 468 is mounted between the first and the second tube portions 462 and 460, the third wheel support assembly 422 being mounted to the second tube portion 460. The purpose of the telescopic arrangement of the tubes portions 460 and 462 and of the hydraulic cylinder 468 will be described hereinafter.

FIG. 7 of the appended drawings schematically illustrates, in dashed lines, wheels 452, 454 and 456 mounted to the wheel support assemblies 414, 418 and 422, respectively. Also illustrated in this figure is an endless track 458 mounted around wheels 452, 454 and 456.

It is to be noted that the structure of the first, second and third wheel support assemblies 414, 418 and 422 may vary from the structure illustrated in FIG. 7. Indeed, depending on the type of wheel and on the type of motor being used, the structure of the wheel support assemblies 414, 418 and 422 may be modified to support the wheels and motors used.

As will be apparent to one skilled in the art, the telescopic arrangement of the tube portions 460 and 462 provides means to reduce the length of the second walking beam 412 to allow the installation or the removal of the endless track 458 from the wheels 452, 454 and 456. When the installation of the endless track is completed, the hydraulic cylinder 468 is actuated to provide an adequate tension to the endless track 458. The hydraulic cylinder 468 could evidently be replaced by other mechanical equivalents.

The first walking beam 410 is pivotally mounted to a frame or under-frame (not shown) through a first shaft 428 extending laterally from the frame. The first shaft 428 has a circular cross-section to allow the pivoting of the first walking beam 410 thereon. Of course, bearings or other friction reduction devices may be used to reduce the friction between the first shaft 428 and the first walking beam 410. It is to be understood that the first walking beam 410 may pivot on the first shaft 428 independently from the first walking beam (not shown) mounted on the other side of the frame.

The second walking beam 412 has a rectangular external cross-section and is pivotally mounted to a second shaft 434 through a pivoting element 430. More specifically, the second walking beam 412 is fixedly mounted to the pivoting element 430 which is pivotally mounted to the second shaft 434 through an aperture 435 of the pivoting element 430. The second shaft 434 has a circular cross-section to allow the pivoting of the second walking beam 412 thereon. Of course, bearings or other friction reduction devices may be used to reduce the friction between the pivoting element 430 and the second shaft 434. It is to be noted that the second shaft 434 is located above a hypothetical line (not shown) joining the center of the wheel support assemblies 414, 418 and 422. It is to be understood that the second walking beam 412 may pivot on the second shaft 434 independently from the second walking beam (not shown) mounted on the other side of the frame.

The second walking beam 412 also includes an inner end 436 comprising a rod 437 having a circular cross-section inserted in the hollow tube 462 and secured thereto, for example by welding (see 439 in FIG. 8).

A range limiting mechanism 470 is provided to pivotally connect the rod 437 of the inner end 436 of the second walking beam 412 to the second wheel support assembly 418.

Referring now to FIGS. 8 and 9, the range limiting mechanism 470 includes an upwardly angled securing portion 472 comprising a first and a second flat elements 474 and 476 spaced apart from one another. Each flat element 474 and 476 includes an aperture 478. The connecting portion 472 may be mounted to the second wheel support assembly 418 by inserting a portion of the second wheel support assembly between the flat elements 474 and 476 and by inserting a pivot pin or other fastener 480 in the apertures 478. The second wheel support assembly also includes an aperture (not shown) adapted to receive the pivot pin 480.

The range limiting mechanism 470 also includes a hollow walking beam receiving tube 482 having a circular cross-section. The inner diameter of the receiving tube 482 is substantially larger than the outer diameter of the rod 437 so as to allow the insertion of the rod 437 into the receiving tube 482. A layer of friction reducing material 484 is mounted between the rod 437 and the receiving tube 482 to reduce the friction therebetween.

The receiving tube 482 also includes a transversal aperture 486 having a flat side 486'. A first and a second stopping pieces 488 and 490 are mounted, in the transversal aperture 486, to the rod 437 through a fastener 492. The first stopping piece 488 is smaller than the transversal aperture 486 and includes an abutting surface 488'. The second stopping piece 490 is smaller than the transversal aperture 486 and includes an abutting surface 490'. Therefore, the rod 437 may partially slide out of the receiving tube 482 until the first abutting surfaces 488' and 490' of the stopping pieces 488 and 490, respectively, contact the flat side 486' of the transversal aperture 486.

The rod 437 of the inner end 436 is therefore slidably inserted in the receiving tube 482 of the range limiting mechanism 470 and the longitudinal sliding movements of the rod 437 in the receiving tube 482 are limited by the stopping pieces 488 and 490 abutting the sides of the transversal aperture 486.

It is to be noted that the stopping pieces 488 and 490 are narrower the transversal aperture 486, as can be seen from FIG. 9. This feature is important in the case where the frame to which the range limiting mechanism 470 is installed is a frame similar to the frame 26 of FIG. 2. Indeed, if a conventional pivoting arrangement 27 is provided to allow the second shaft 434 to pivot with respect to a longitudinal axis 29 of the frame 26, the rod 437 will rotate with respect to the receiving tube 482 and the transversal aperture 486 must be sufficiently wide to allow the lateral movements of the stopping pieces 488 and 490 therein.

Similarly, as can be seen from FIG. 9, the distance separating the first and the second flat elements 474 and 476 is substantially wider than the thickness of the second wheel support assembly 418 (shown in dashed lines). Again, this feature is important in the case where the frame to which the range limiting mechanism 470 is installed is a frame similar to the frame 26 of FIG. 2. Indeed, if a conventional pivoting arrangement 27 is provided to allow the second shaft 434 to pivot with respect to a longitudinal axis 29 of the frame 26, the rod 437 will rotate with respect to the receiving tube 482 and the range limiting mechanism 470 will possibly be moved laterally. By providing a distance separating the first and the second flat elements 474 and 476 substantially wider than the thickness of the second wheel support assembly 418, lateral displacement of the range limiting mechanism 470 with respect to the second wheel support assembly 418 is allowed.

FIG. 10 illustrates a side plan view of the track tensioning system 400 of FIG. 7 in operation over a bulging surface 500. Since the surface 500 presents a convex cross-section, the second wheel support assembly 418 is pushed higher than the first and third wheel support assemblies 414 and 422. A lower portion 502 of the endless track 458 is maintained against a lower portion 504 of the second wheel 454 by the bulging surface 500.

As can be easily understood, the length of the endless track 458 illustrated in FIGS. 7 and 10 does not change. Therefore, to prevent damages to the endless track 458, when the second wheel support assembly 418 rises as illustrated in FIG. 10, the effective length of the first and second walking beams 410 and 412 must be decreased to thereby keep a substantially uniform tension on the endless track 458 and avoid over-tensioning the endless track 458.

As previously mentioned, the second shaft 434 is positioned above a hypothetical line joining the center of the first, second and third wheel support assemblies 414, 418 and 422 when the first and second walking beams 410 and 412 are in the position illustrated in FIG. 7. As illustrated in FIG. 10, this position of the second shaft 434, enables the first wheel support assembly 414 to be moved closer to the third wheel support assembly 422 when the endless track 458 is over a bulging surface 500, allowing the tension of the endless track 458 to remain substantially uniform for a limited upward movement of the second wheel support assembly 418.

FIG. 10 illustrates the highest position of the second wheel support assembly 418 for the track tensioning system 400 illustrated. As can be seen from FIG. 12, the abutting surface 488' of the stopping piece 488 abuts the flat side 486' of the transversal opening 486 and the abutting surface 490' of the stopping piece 490 abuts the flat side 486' of the transversal opening 486; therefore, the second wheel support assembly 418 cannot extend higher than the position illustrated in FIG. 10 since the rod 437 may not slide further out of the receiving tube 482.

FIG. 11 illustrates a side plan view of the track tensioning system 400 of FIG. 7 in operation over a surface forming a depression 510. Since the surface 510 presents a concave cross-section, the second wheel support assembly 518 is pushed lower than the first and third wheel support assemblies 414 and 422. An upper portion 506 of the endless track 458 is not in contact with the second wheel 454.

As can be easily understood, the length of the endless track 458 illustrated in FIGS. 7 and 11 does not change. Therefore, to prevent endless track 458 from being disengaged from the wheels 452, 454 and 458, when the second wheel support assembly 418 is lowered as illustrated in FIG. 11, the effective length of the walking beams 410 and 412 must be increased to thereby keep a substantially uniform tension on the endless track 458 and avoid under-tensioning of the endless track 458.

Again, the position of the second shaft 434 above a hypothetical line joining the center of the first, second and third wheel support assemblies 414, 418 and 422 when the first and second walking beams 410 and 412 are in the position illustrated in FIG. 7, enables the first wheel support assembly 414 to be moved farther away from the third wheel support assembly 422 when the endless track 458 is over a surface forming a depression 510. The tension of the endless track 458 therefore remains substantially uniform for a limited downward movement of the second wheel support assembly 418.

FIG. 11 illustrates the lowest position of the second wheel support assembly 418 for the track tensioning system 400 illustrated. As can be seen from FIG. 13, the abutting surface 488' of the stopping piece 488 abuts the flat side 486' of the transversal opening 486 and the abutting surface 490' of the stopping piece 490 abuts the flat side 486' of the transversal opening 486; therefore, the second wheel support assembly 418 cannot extend lower than the position illustrated in FIG. 11 since the rod 437 may not slide further out of the receiving tube 482.

As can be easily understood, by modifying the position of the second shaft 434, the size of the transversal aperture 486 and/or the size of the stopping pieces 488 and 490, it is possible to provide a track tensioning system having a second wheel support assembly 418 which can travel higher than illustrated in FIG. 10 while keeping the tension of the endless track 458 substantially uniform. Similarly, it is possible to design a track tensioning system having a second wheel support assembly 418 which can travel lower than illustrated in FIG. 11 while keeping the tension of the endless track 458 substantially uniform.

It is to be noted that when the suspension 400 is in the position illustrated in FIG. 7, the pivot pin 480 is placed on a hypothetical line joining the center of the first shaft 428 and the center of the second shaft 434. In this way, the range limiting mechanism 470 provides an uniform limiting effect when the suspension 400 goes over a bulging surface 500 (FIG. 10) or a surface forming a depression 510 (FIG. 11). Indeed, the angle formed by the first and second walking beams 410 and 412 in FIG. 10 is similar to the angle formed by the first and second walking beams 410 and 412 in FIG. 11.

Although the present invention has been described hereinabove by way of preferred embodiments thereof, it can be modified, without departing from the spirit and nature of the subject invention as defined in the appended claims.

What is claimed is:

1. A range limiting mechanism for a track tensioning system of a track-propelled vehicle, said track propelled vehicle having a frame and first and second longitudinally spaced shafts extending laterally from each opposite side of said frame; said track tensioning system having:

a first walking beam pivotally mounted to each said first shaft and having an inner end and an outer end;

a first wheel support assembly mounted at said outer end of said first walking beam;

a second wheel support assembly mounted at said inner end of said first walking beam;

a second walking beam pivotally mounted to each said second shaft and having an inner end and an outer end;

a third wheel support assembly mounted at said outer end of said second walking beam; said range limiting mechanism comprising:

a first end mounted to said inner end of said second walking beam;

a second end;

a pivot connection having a pivot axis; said pivot connection joining said second end of said range limiting mechanism to said second wheel support assembly; and means limiting pivotal movement of said first and second walking beams about said first and second shafts, respectively, when said first and second walking beams have reached a predetermined angle of pivotment, said limiting means being separate from said frame of said track propelled vehicle.

2. A range limiting mechanism as defined in claim 1, wherein said track tensioning system also includes means allowing said second walking beam to be longitudinally displaced while being pivotally mounted to said second shaft; said means allowing said second walking beam to be longitudinally displaced consisting of a hollow tube having an internal cross-sectional area slightly larger that an external cross-sectional area of the second walking beam to thereby allow the second walking beam to slide therein; said hollow tube being pivotally mounted to said second shaft; and wherein said pivot axis of said pivot connection lies above a plane comprising said first, second and third wheel support assemblies when said first, second and third wheel support assemblies are coplanar.

3. A range limiting mechanism as defined in claim 2, wherein said means limiting pivotal movement of said first and second walking beams further comprise:

an arcuate portion joining said first and second ends of said range limiting mechanism; said arcuate portion having a concave inner surface facing said second wheel support assembly; said pivoting of said first and second walking beams in a first direction causes the concave inner surface to contact the second wheel support assembly when said first and second walking beams have reached said predetermined angle of pivotment.

4. A range limiting mechanism as defined in claim 3, wherein said second end of said means limiting pivotal movement of said first and second walking beams further comprises:

a projection having a flat surface facing an external surface of said first walking beam; said pivoting of said first and second walking beams in a second direction causing the flat surface of said projection to contact said external surface of said first walking beam when said first and second walking beams have reached said predetermined angle of pivotment.

5. A range limiting mechanism as defined in claim 4, wherein said first direction of said pivoting of said first and second walking beams occurs when said second wheel assembly is upwardly displaced; and wherein said second direction of said pivoting of said first and second walking beams occurs when said second wheel assembly is downwardly displaced.

6. A range limiting mechanism as defined in claim 1, wherein one of said first and second shafts of said track-propelled vehicle lies above a plane joining said first, second and third wheel support assemblies when said first, second and third wheel support assemblies are coplanar; and wherein said means limiting pivotal movement of said first and second walking beams include:

an extendable joint interconnecting said first end and said second end of said range limiting mechanism; and an extension limiting member for limiting the extension of said extendable joint when a predetermined extension is reached; said means for limiting pivotal movement of said first and second walking beams limiting pivotal movement by limiting the extension of said extendable joint through said extension limiting member when said first and second walking beams have reached said predetermined angle of pivotment.

7. A range limiting mechanism as defined in claim 6, wherein said first end of said range limiting mechanism has a circular external cross-section; and wherein said extendable joint consists of a hollow tube having a circular internal cross-section; said hollow tube having an open end and a closed end; said first end of said range limiting mechanism being telescopically inserted in said open end of said hollow tube; said closed end being secured to said second end of said range limiting mechanism.

8. A range limiting mechanism as defined in claim 7, wherein said hollow tube includes a transversal opening forming a peripheral wall; and wherein said extension limiting member consists of a stopping piece removably mounted to said first end of said range limiting mechanism when said first end of said range limiting mechanism is inserted in said hollow tube; said stopping piece being mounted so as to abut the peripheral wall of said transversal aperture when said predetermined extension is reached, therefore limiting the telescoping movement of said first end of said range limiting mechanism in said hollow tube.

9. A range limiting mechanism as defined in claim 8, further comprising a layer of friction reducing material inserted between the external surface of the first end of said range limiting mechanism and the internal surface of said hollow tube of said range limiting mechanism.

* * * * *